(12) United States Patent
Sivan

(10) Patent No.: US 6,421,066 B1
(45) Date of Patent: Jul. 16, 2002

(54) METHOD FOR CREATING A KNOWLEDGE MAP

(75) Inventor: Yesha Y. Sivan, Ramat Hasharon (IL)

(73) Assignee: KLAB.Com - The Knowledge Infrastructure Laboratory Ltd., Shefayim (IL)

(*) Notice: Subject to any disclaimer, the term of this patent is extended or adjusted under 35 U.S.C. 154(b) by 0 days.

(21) Appl. No.: 09/274,952

(22) Filed: Mar. 23, 1999

(51) Int. Cl.[7] ............................................. C06K 15/00
(52) U.S. Cl. ..................................... 345/712; 345/855
(58) Field of Search ........................... 345/356, 357, 345/352–354, 348, 349, 837, 839, 838, 847, 853–859, 855, 712–713, 714, 775; 707/10, 100

(56) References Cited

U.S. PATENT DOCUMENTS

| | | | | |
|---|---|---|---|---|
| 5,297,253 A | * | 3/1994 | Meisel | 345/357 |
| 5,878,421 A | * | 3/1999 | Perrel et al. | 707/100 |
| 5,978,804 A | * | 11/1999 | Dietzman | 707/10 |
| 6,020,881 A | * | 2/2000 | Naughton et al. | 345/327 |
| 6,091,956 A | * | 7/2000 | Hollenberg | 455/456 |
| 6,092,076 A | * | 7/2000 | McDonough et al. | 707/102 |
| 6,144,962 A | * | 11/2000 | Weihberg et al. | 707/10 |
| 6,154,209 A | * | 11/2000 | Naughton et al. | 345/339 |
| 6,160,551 A | * | 12/2000 | Naughton et al. | 345/339 |

* cited by examiner

Primary Examiner—Steven Sax
(74) Attorney, Agent, or Firm—Davidson, Davidson & Kappel, LLC

(57) ABSTRACT

A method for creating and displaying a knowledge map software interface which is easy for the user to understand and operate. The map preferably includes a plurality of standard representative symbols, optionally with an additional label, which immediately indicate to the user the type of knowledge represented. Each such symbol is an icon, which leads to a particular knowledge service or product when selected by the user. The symbols are arranged on the geographical space of the knowledge map in a manner which indicates the relationship between the symbols. Preferably the physical space of the map is divided into different sections, each representing a particular aspect of the knowledge management system.

20 Claims, 14 Drawing Sheets

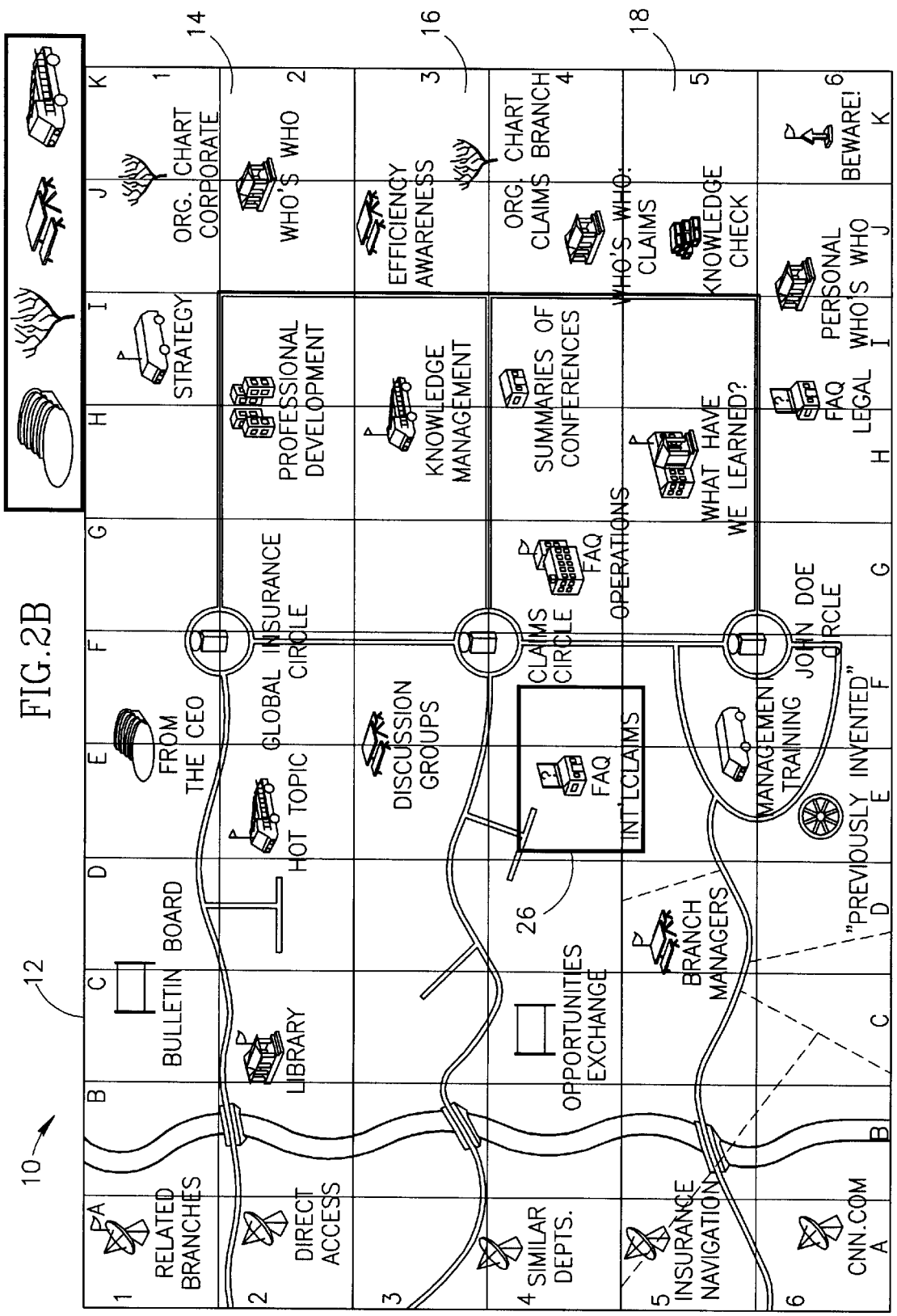

METHOD FOR CREATING A KNOWLEDGE MAP

FIELD AND BACKGROUND OF THE INVENTION

The present invention relates to a method for creating a knowledge map, and in particular, to a method in which such a knowledge map is organized according to an easily assimilated format which is simple to understand and to maintain, thereby maximizing the efficacy and management of knowledge.

The explosion of information available through the Internet, particularly through the Web, has increased the possibilities for searching for information through publicly available databases and electronic resources. Furthermore, many large organizations, such as corporations, maintain intranets, or internal networks, which connect the computers belonging to the organization. Such internal networks enable organizational users to search for information through databases and other electronic resources. Paradoxically, however, the growth of opportunities for information searching has not resulted in a concurrent increase in the ability to quickly and easily find the desired information.

The paradox arises because information which is available through databases and other electronic resources, or digitally-stored knowledge, can easily be retrieved only if the user specifically knows how to select the useful information, relying on knowledge of how the database was constructed, how the information is organized within the database, and ultimately how to phrase the query which reveals the desired information. Without such knowledge of the system according to which the information is stored, searches are difficult and frustrating for the user.

Search engines are a primary example of the difficulty of locating the desired information within the huge amount of available, but largely irrelevant, information. Search engines are often used to search for Web pages on the Internet, or within corporate intranets, for example by keyword or through "natural language" queries. However, users often find such search engines frustrating to operate, since even "natural language" queries which are incorrectly phrased produce irrelevant or useless information. Keyword-based searches are even more problematic, as they often produce irrelevant results. Thus, currently available search engines are not necessarily useful for locating information on the Internet or intranets.

In order to overcome difficulties associated with simple search engines, more complex solutions have been proposed to organize information in a more useful and accessible system. For example, data warehouses are an extension of classic database methodologies which are specialized for storing and processing large amounts of data. These data warehouses organize data collected from automated systems, thereby maintaining an organizational repository of such data. However, information is still difficult to obtain from data warehouses through searches, because the data warehouse itself is structured to store information and not to analyze and process the information.

Document management tools attempt to provide more data analysis and processing by providing a navigation interface for accessing digitally-stored knowledge stored as documents, since a document is a typical logical (rather than physical) information storage unit. These tools often incorporate a certain model of data workflow and organizational structures in order to help the user find the document(s) with the desired information, through knowledge mapping. Such mapping is at least partially achieved by users who notify the system of categorical information on a document and its content when documents are generated. Currently available document management tools provide an interface which is often difficult to understand and to assimilate, particularly for users who are less familiar with computers and with the traditional GUI (graphical user interface) format.

Indeed, a significant drawback of all of these knowledge management tools is that they require the user to adjust to the interface and to the method for present information, such that the user must operate an often counterintuitive, complex and unwieldy interface. The user may simply ignore the computer as a result, or at the very least fail to make full use of the resources available through the computer. Thus, the full power of currently available knowledge management systems may not be exploited by the user, simply because the interface is counterintuitive, and difficult to understand and use.

A good example of an intuitive, easily assimilated, simply-operated interface is a map, such as a road map. The map features a plurality of known symbols, representing, for example, gas stations, restaurants, hospitals, hotels and other resources which the traveler may require. These symbols are organized according to their physical location, relative to the location of roads, towns and other landmarks. The map may be further colored, for example to indicate a body of water or to show empty fields, thereby further orienting the traveler in physical space. Thus, unlike currently available GUI interfaces, the map is easier to understand and to use.

Therefore, there is an unmet need for, and it would be highly useful to have, a GUI interface which combines the ease of understanding a map with the power and sophistication of a knowledge management tool, such that even an inexperienced computer user can easily grasp the principles of the GUI interface and is thus able to effectively operate knowledge management applications.

SUMMARY OF THE INVENTION

The present invention is of a method for creating and displaying a knowledge map software interface which is easy for the user to understand and to operate. The map preferably includes a plurality of standard representative symbols, optionally with an additional label, which immediately indicate to the user the type of knowledge represented. Each such symbol is an icon which leads to a particular knowledge service when selected by the user, for example by "clicking" with a mouse or other pointer device. These symbols are arranged on the physical space of the map in a manner which indicates the relationship between the symbols, and hence the relationship between the different types of knowledge services represented.

Preferably, the physical space of the map is divided into different sections, each representing a particular division of the knowledge management system. For example, if the user is a member of a corporation, preferably the division of the physical space of the map includes a section for the overall corporate information, a section for the department to which the user belongs, and a section for personal organization by the user. More preferably an additional section of the map is provided for knowledge services which are outside the organization, yet which still may be useful to the user as a member of the organization, as a member of the department within the organization, or according to the professional role of the user, for example. Thus, both the symbols, or iconography, and the physical organization of the map aid the user to understand and to operate the knowledge management software interface.

More preferably, the knowledge management software interface includes a display substrate and iconography which features a stylized representation of a geographical map. A geographical map may include a portion which is colored blue, to represent water, or green, to represent an agricultural or park area, for example. In addition, such a geographical map may include lines which represent roads. The iconography associated with such a map is clearly understood by the user, who would immediately recognize a curved blue line as the icon symbolizing a river, for example. Thus, geographical iconography and a geographical substrate are particularly preferred for the knowledge management interface of the present invention.

According to the present invention, there is provided a method for displaying a knowledge map interface for organizing a plurality of knowledge services for a user, the steps of the method being performed by a data processor, the method comprising the steps of: (a) providing a knowledge map display substrate, the knowledge map display substrate being divided into a plurality of portions, each of the portions representing one of a plurality of knowledge categories; (b) providing a plurality of icons for being displayed on a knowledge map display substrate; (c) characterizing each of the plurality of knowledge services according to a knowledge category; (d) selecting an icon of the plurality of icons for representing each of the plurality of knowledge services; and (e) placing the icon on one of the plurality of portions of the knowledge map display substrate according to the knowledge category, such that when the user selects the icon, the knowledge service is accessed.

Hereinafter, the term "computing platform" refers to a particular computer hardware system or to a particular software operating system. Examples of such hardware systems include, but are not limited to, personal computers (PC), Macintosh™ computers, mainframes, minicomputers and workstations. Examples of such software operating systems include, but are not limited to, UNIX, VMS, Linux, MacOS™, DOS, one of the Windows™ operating systems by Microsoft Inc. (Seattle, Wash., USA), including Windows NT™, Windows 3.x™ (in which "x" is a version number, such as "Windows 3.1™"), Windows95™, Windows98™ and Windows CE™.

The present invention could be described as a series of steps implemented by a data processor, such that the present invention could be implemented as hardware, software or firmware, or a combination thereof. For the present invention, a software application could be written in substantially suitable programming language, which could easily be selected by one of ordinary skill in the art. The programming language chosen should be compatible with the computing platform according to which the software application is executed. Examples of suitable programming languages include, but are not limited to, C, C++ and Java.

BRIEF DESCRIPTION OF THE DRAWINGS

The invention is herein described, by way of example only, with reference to the accompanying drawings, wherein:

FIGS. 2A–2E are illustrative knowledge maps according to the present invention, showing a map without icons in FIG. 2A, and a description of different types of icons in FIGS. 2B–2E.

DESCRIPTION OF THE PREFERRED EMBODIMENTS

Figure 1A:
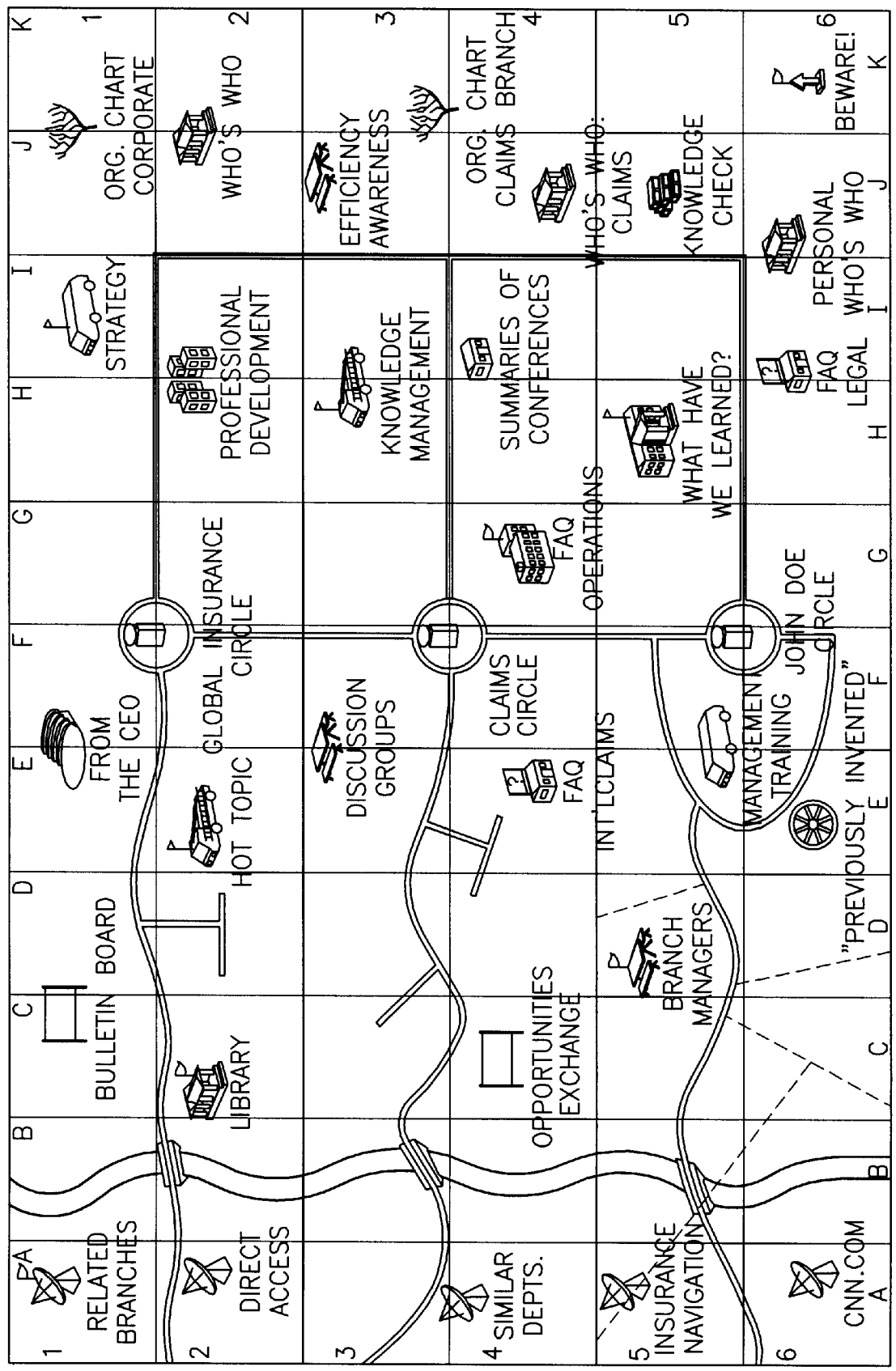
FIGS. 1A–1G show illustrative knowledge maps according to the present invention, with different sections of the map indicated and described in each Figure.

The present invention is of a method for creating and displaying a knowledge map interface which is easy for the user to understand and to operate. The map preferably includes a plurality of standard representative symbols, optionally with an additional label, which immediately indicate to the user the type of knowledge represented. Each such symbol is an icon which leads to a particular knowledge service when selected by the user, for example by "clicking" with a mouse or other pointer device. These symbols are arranged on the physical space of the map in a manner which indicates the relationship between the symbols, and hence the relationship between the different types of knowledge services represented.

Preferably, the physical space of the map is divided into different sections, each representing a particular aspect of the knowledge management system. For example, if the user is a member of an organization, preferably the division of the physical space of the map includes a section for general organizational knowledge, a section for the department to which the user belongs, and a section for personal organization by the user. More preferably an additional section of the map is provided for knowledge services which are outside the corporation, yet which still may be useful to the user as a member of the organization, as a member of the department within the organization, or according to the professional role of the user, for example. Thus, both the symbols, or iconography, and the physical organization of the map aid the user to understand and to operate the knowledge management interface.

More preferably, the knowledge management interface includes a display substrate and iconography which features a stylized representation of a geographical map. A geographical map may include a portion which is colored blue, to represent water, or green, to represent an agricultural or park area for example. In addition, such a geographical map may include lines which represent roads. The iconography associated with such a map is clearly understood by the user, who would immediately recognize a curved blue line as the icon symbolizing a river, for example. Thus, geographical iconography and a geographical substrate are particularly preferred for the knowledge management interface of the present invention.

The principles and operation of the method according to the present invention may be better understood with reference to the drawings and the accompanying description.

Referring now to the drawings, FIGS. 1A–1G show one exemplary knowledge map interface according to the present invention for the purposes of discussion only and without any intention to be limiting. A particular section of the map is emphasized in each of FIGS. 1B–1G by placing a rectangle over that section. Each of FIGS. 1A–1G demonstrates the ease for locating particular types of knowledge services through such a map.

Although the description below is of a "knowledge map," it is understood that such a map is implemented as a GUI (graphical user interface) software interface for being operated and displayed by a computer, as previously described. Similarly, the term "icon" is a term of art in the area of computer software, which refers to a geometric shape displayed by the GUI, which causes a software application to be launched or other action by the computer to occur when selected by the user, for example with a mouse or other pointing device. The icon may be an abstract shape, but for the purposes of the present invention is preferably a picture, more preferably of a recognizable, if stylized, common object. Most preferably, the icons displayed by the knowledge map uniformly are of recognizable common objects, such that the overall "look" of the icons is uniform and is referred to herein as the "iconography" of the map interface.

One particularly preferred embodiment of the map interface for the knowledge management software interface of the present invention is as a geographical map interface, which is the embodiment shown in FIGS. 1A–1G and 2A–2E. The geographical map interface features a substrate which is a stylized representation of the background to a geographical map, preferably including such symbols as a green portion similar to the representation of a park or agricultural area, and a curve blue line which is similar to the representation of a river. In addition, the geographical map interface preferably features iconography related to such a geographical map, by including stylized representations of buildings and other icons which could appear on such a geographical map. These symbols, and the overall iconography, provide a unified graphic characteristic for the map interface and would therefore be immediately understood by the user as exemplary of one particular type of background art map. Thus, the user would be able to easily operate the knowledge map interface of the present invention.

The entire knowledge map shown in FIG. 1A organizes the knowledge services for an organization to which the user belongs. This organization, which includes both an intuitive iconography and a structured physical layout for indicating the relationships between different types of knowledge services, enables the user to quickly and easily locate the desired knowledge service.

Each knowledge service includes digital data which is related to a particular topic, as well as an operation or operations to be performed on the data. Examples of such operations include, but are not limited to, viewing the data, responding to the data, discussing the data, updating the data and so forth. These operations are typical of functions currently available through different types of knowledge management or information manipulation software programs.

For example, the user could choose to write a response to the data by e-mail (electronic mail), through e-mail software. Alternatively, the user might prefer to send a response by facsimile, through facsimile software. The operations which are available through the knowledge map preferably include these different functions which the user may require to interact with the data of the knowledge service.

Each knowledge service is preferably represented by a different symbol on the knowledge map, which is actually a GUI (graphical user interface) icon. When the user wishes to access the knowledge service, the user selects the icon, thereby activating the knowledge service. Selection could be performed by "clicking" with a mouse or other pointing device, or by touching the icon for a touch-sensitive screen, for example. Various types of icon selection are known and could easily be implemented by one of ordinary skill in the art.

Once the icon has been selected, the knowledge service is then activated. Such activation may optionally be accompanied by the display of an additional window or other GUI display, for example. The user is then able to interact with the data of the knowledge service, and to perform various actions with the data.

Knowledge service icons can preferably be added to the knowledge map, moved to different locations within the map, and even removed from the map when the represented knowledge service becomes obsolete. Each knowledge service icon is preferably related to knowledge concerning a particular topic. The knowledge service may increase in data and/or functionality as it becomes more important as a resource. The knowledge service may then be split into a plurality of knowledge services. Eventually, the knowledge service may no longer be useful, at which point the service is removed, and the corresponding icon is deleted from the map. Thus, the map is preferably an organic, changing tool to help the user quickly and easily locate the desired knowledge.

As described below in greater detail with regard to FIGS. 1B–1D, the map is preferably divided into a plurality of sections, or strips. Each strip is one example of a type of knowledge category into which the knowledge services may be divided. More preferably, as shown, the map includes three horizontal strips, although different numbers of strips are also possible. The advantage of three strips for the organization of a corporation, for example, is that such a structure accommodates a general strip for information related to the organization, a departmental strip for the department to which the user belongs, and a personal strip for the user. Therefore, each map is optionally and preferably adjusted for each user, such that different users are preferably shown different maps. Each strip is preferably independent, the only requirement being that the visual integrity of the map should preferably be preserved by joining the various elements of the strips of the map to form an apparently seamless, flowing map.

Figure 1B:
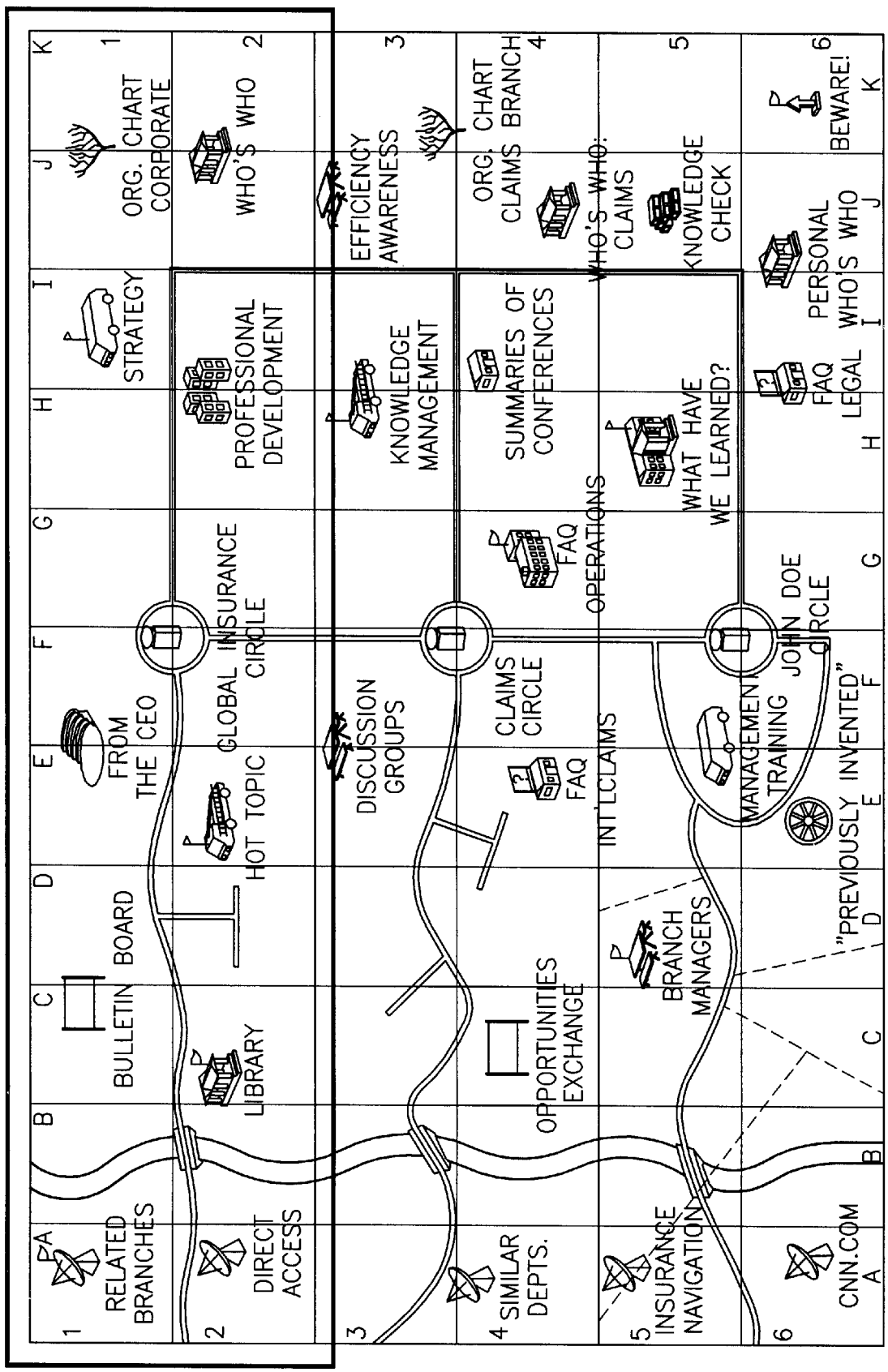

FIG. 1B shows a first strip of the map, indicated with a rectangle placed over the upper portion of the map. The rectangle is only shown for clarity and would not normally be present during the operation of the map by the user. As shown, this first strip of the map is designated for organizational level knowledge services. This strip is preferably shared by all users of the organizational knowledge management system, and as such preferably appears as the uppermost strip in all of the user maps. The knowledge services with icons located in this strip are those which are provided by the organization to all of the users of the knowledge management system, such as the employees of the organization, for example. Typical examples of such knowledge services include, but are not limited to, a description of the hierarchical structure of the organization, one or more messages "From the CEO (Chief Executive Officer)" or other important member of the organization, a strategy for the organization, and so forth.

Figure 1C:
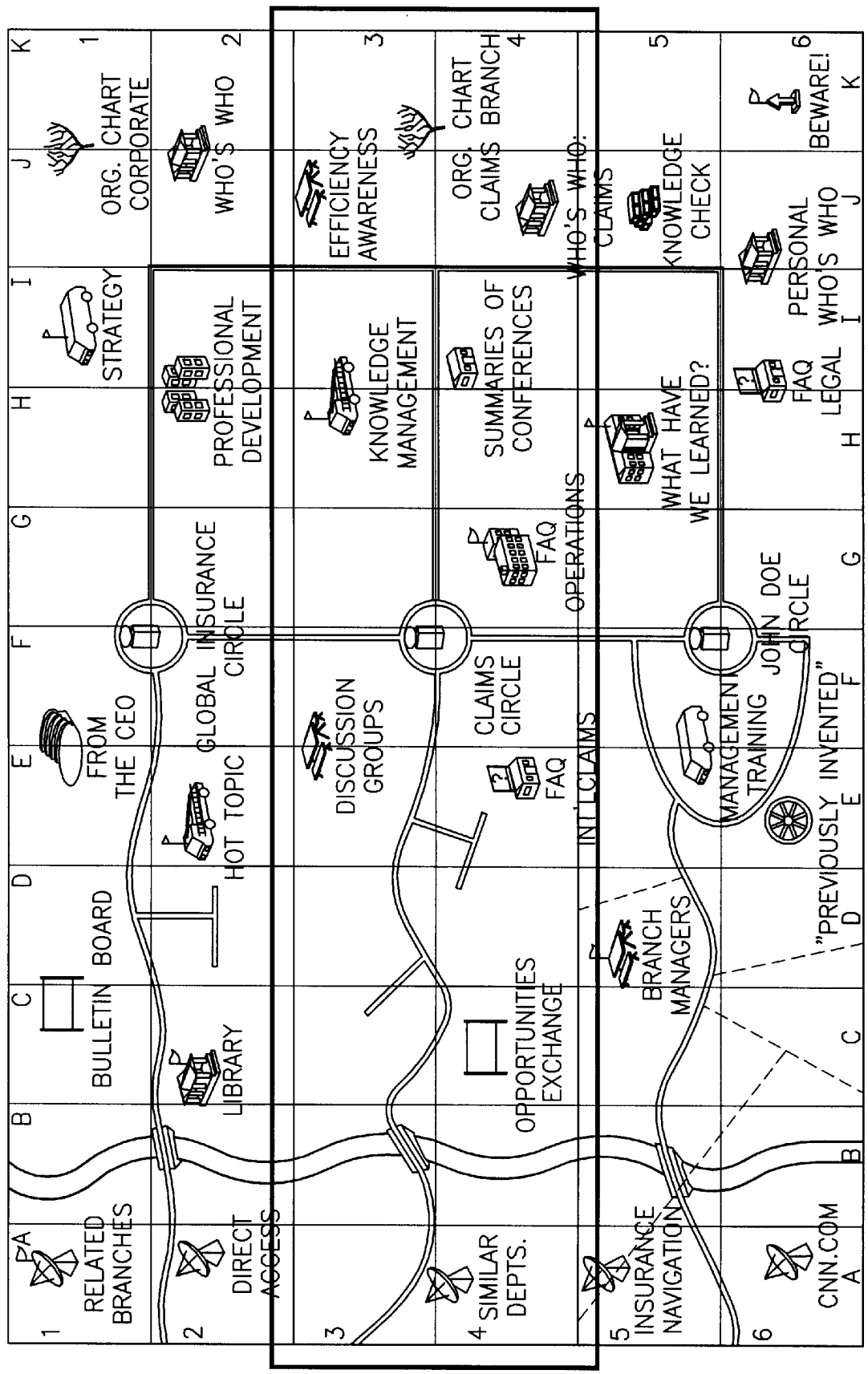

FIG. 1C shows a rectangle emphasizing the middle strip of the map. Again, the rectangle is only shown for clarity and would not normally be present during the operation of the map by the user. The middle strip of the exemplary map shown preferably is designated for icons of knowledge services for a particular department within the organization. This strip is preferably shared by all users who belong to that department, and as such the strip appears in the map of all such users. The knowledge services with icons located in this strip are those which are provided by the organization to all of the users belonging to that department. Typical examples of such knowledge services include, but are not limited to, an FAQ set, or a set of answers to frequently asked questions particular to the department, one or more discussion groups for departmental issues, information related to internal procedures, available courses and so forth.

Figure 1D:
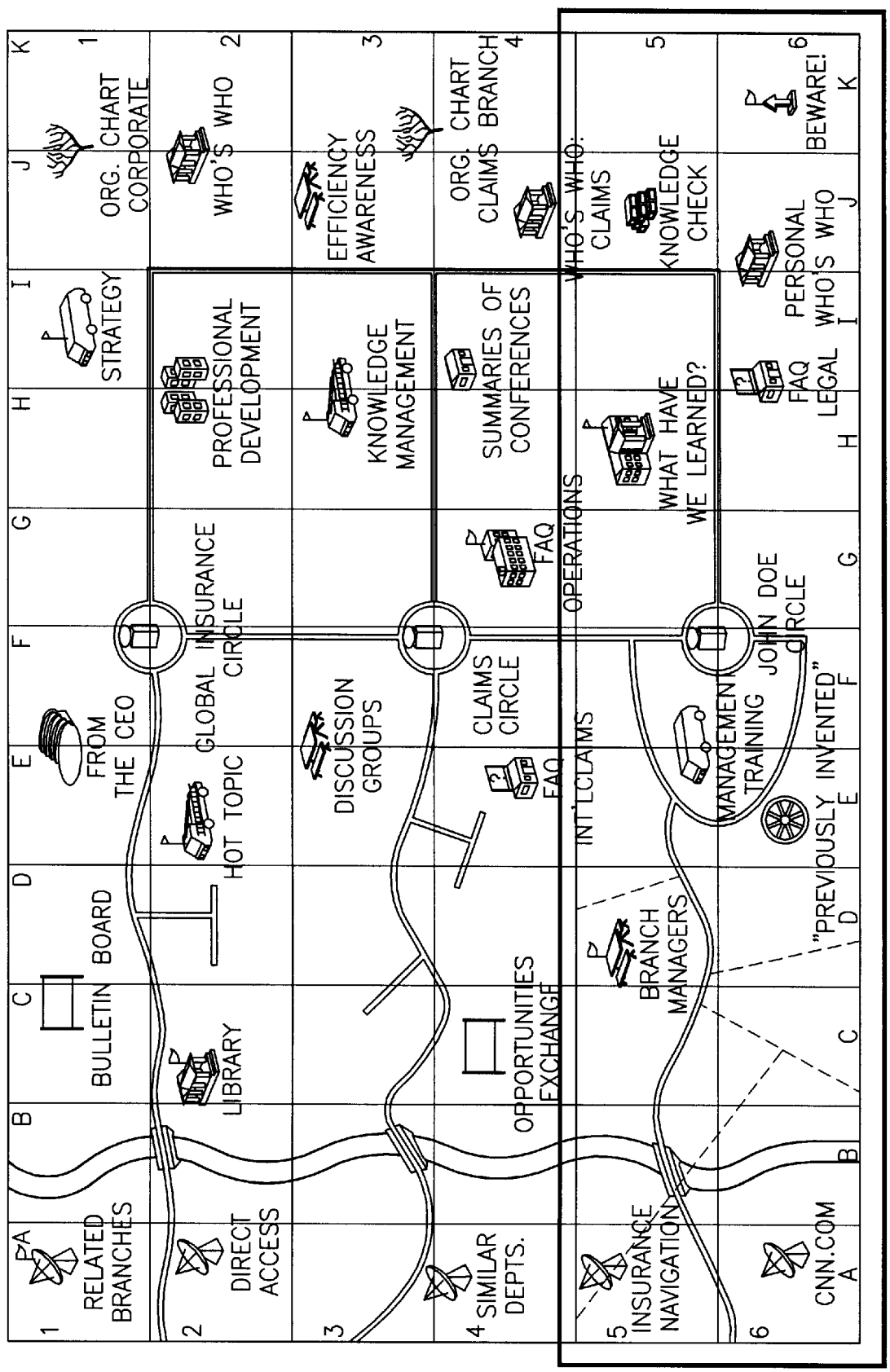

FIG. 1D has a rectangle emphasizing the bottom strip of the map, although again, such a rectangle is only shown for clarity and would not normally be present during the operation of the map by the user. The bottom strip of the exemplary map shown preferably is designated for icons of knowledge services adjusted or "personalized" for the individual user, and as such the strip is preferably different in the map of all such users. The knowledge services with icons located in this strip are those which are provided specifically for, or selected by, the user of the map. Typical examples of such knowledge services include, but are not limited to, services required by the user to perform specific tasks. Optionally, the manager or supervisor of the user selects such services from the complete list of services which are provided by the knowledge management system, either in combination with, or in place of, input from the user.

Figure 1E:
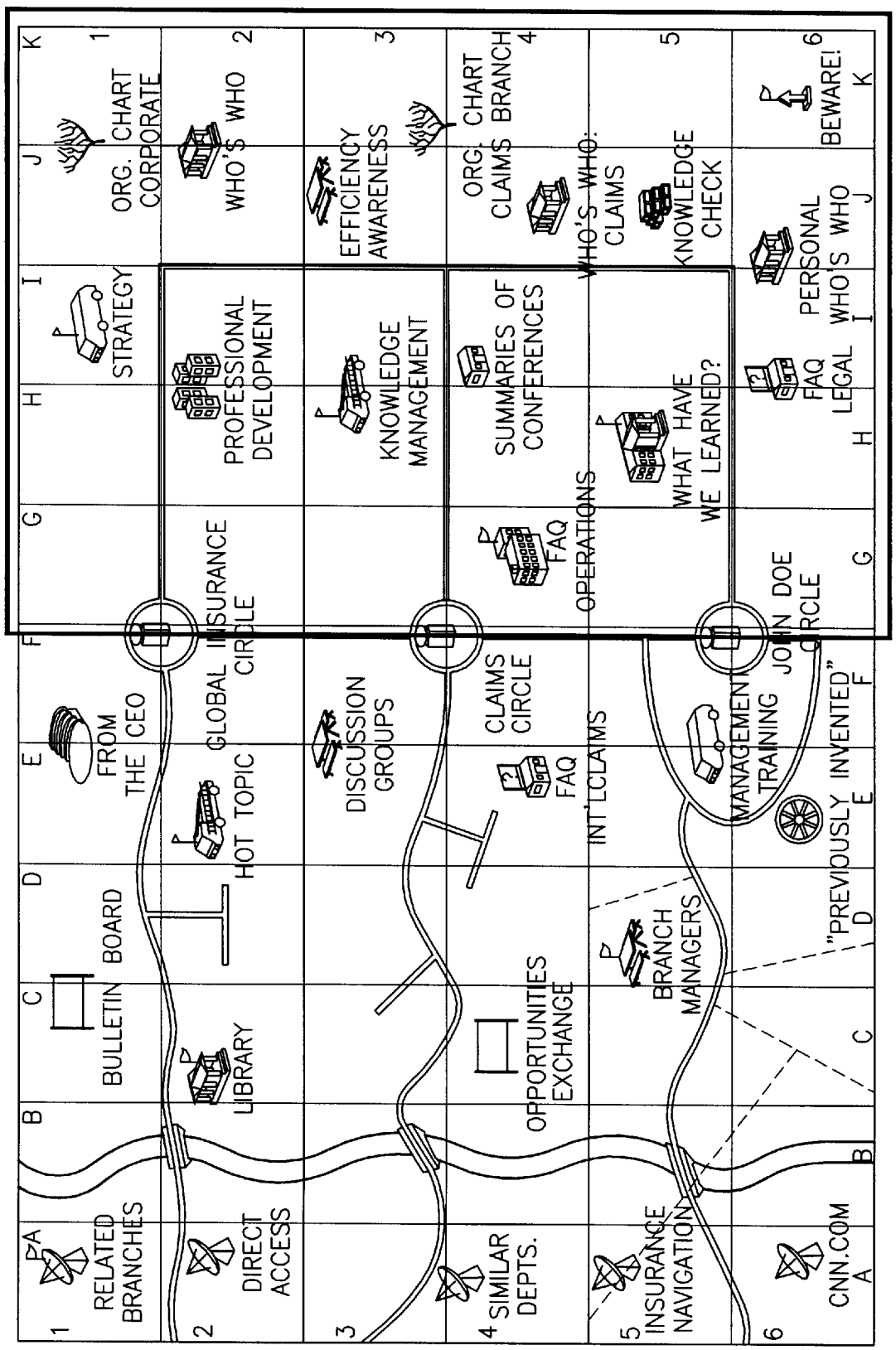
Figure 1F:
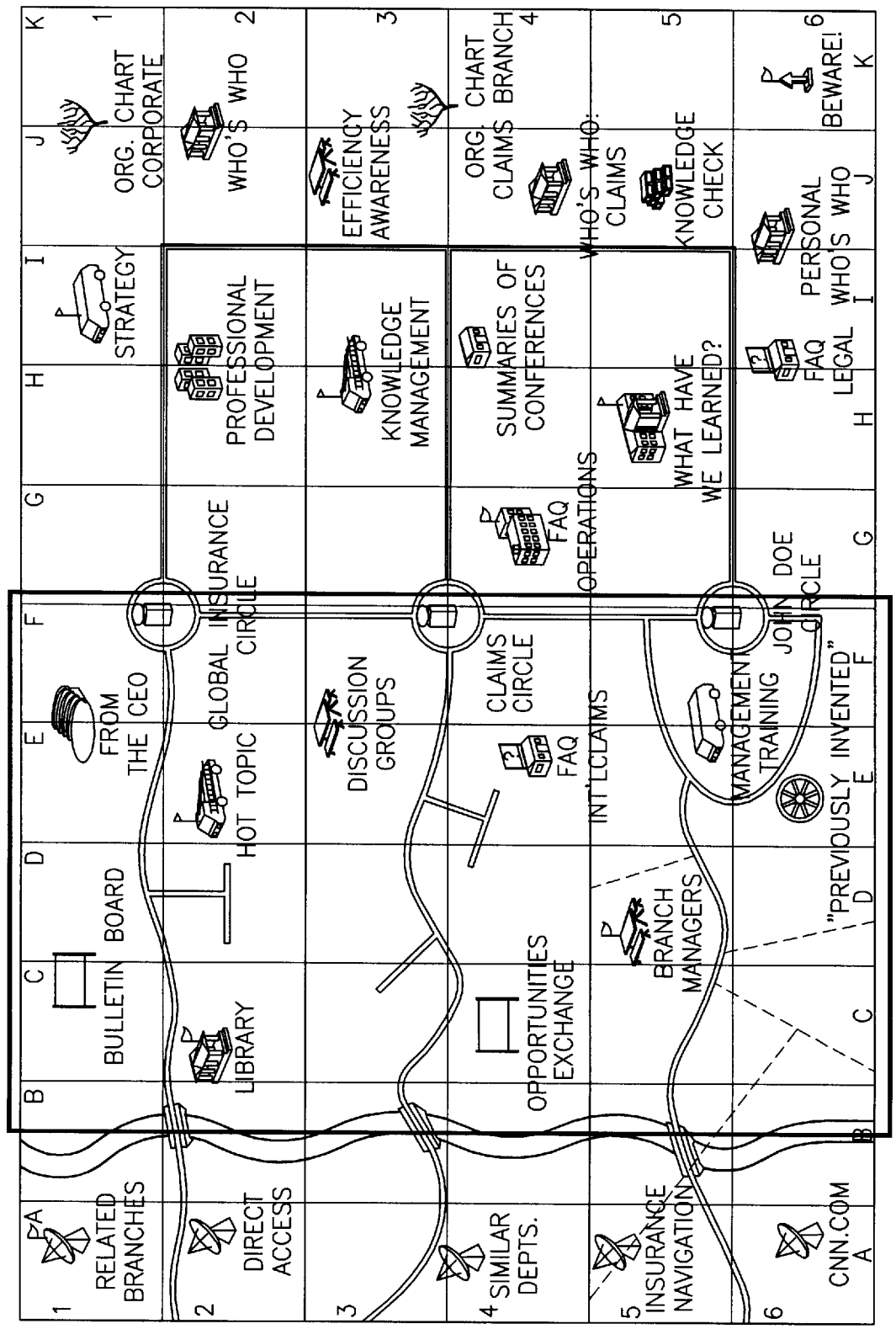
Figure 1G:
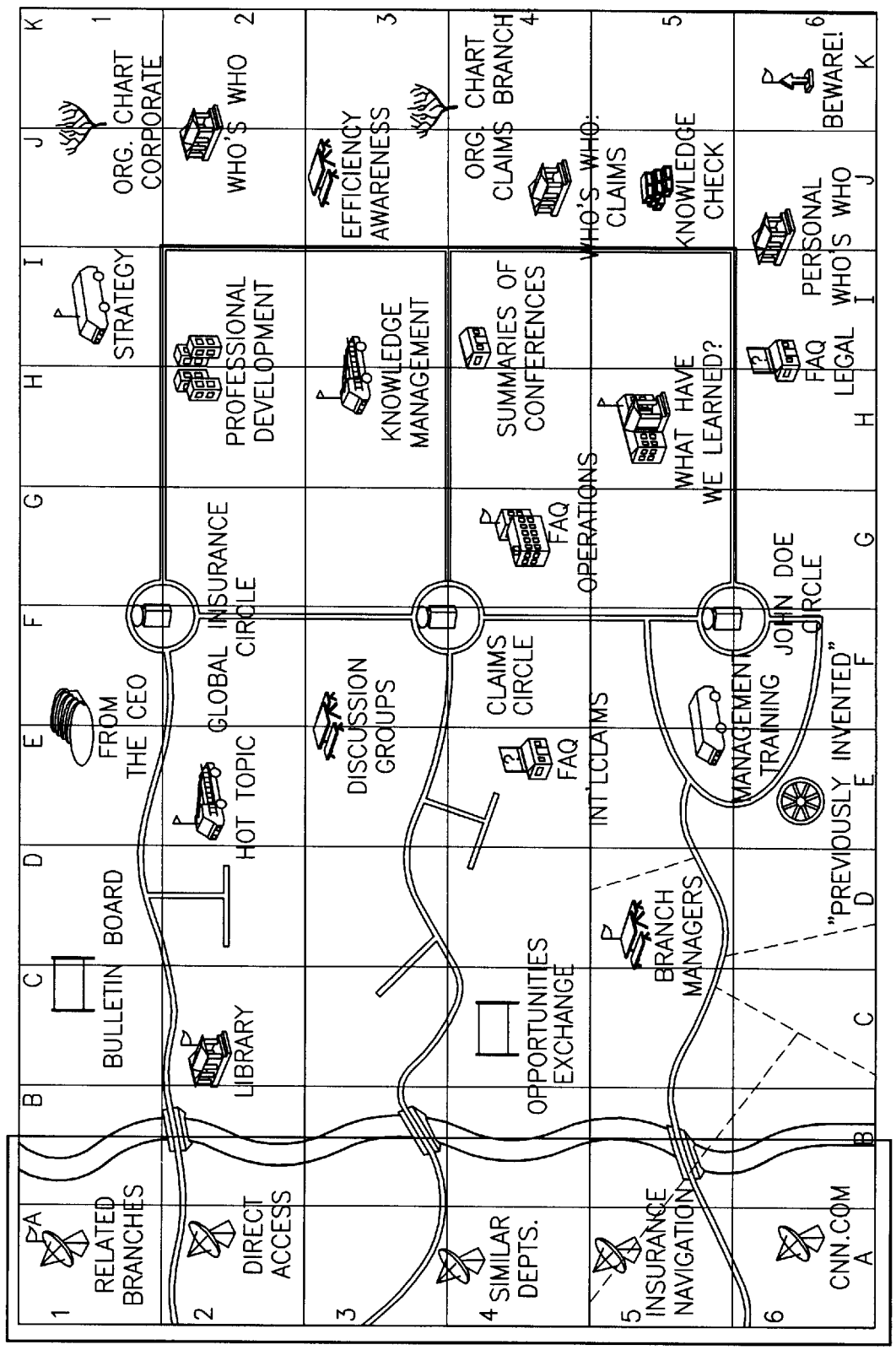

In addition, preferably the overall physical layout of the map is further structured in order to help the user locate the desired knowledge service icon, and hence the desired knowledge service, quickly and easily. FIGS. 1E–1G illustrate a further division of the map into vertical sections, which preferably indicate different types of knowledge than the horizontal strips described in FIGS. 1B–1D. Again, each vertical section is emphasized in each of FIGS. 1E–1G with a superimposed rectangle, which is only shown for clarity and would not normally be present during the operation of the map by the user. Each vertical section is also one example of a type of knowledge category into which the knowledge services may be divided.

FIG. 1E indicates a vertical section of the map in which icons for more "formal" knowledge services are optionally located. The designation of a knowledge service as more or less "formal" is qualitative, and is intended to designate those services which are more rigid and official, and less personalized. Preferably, the categorization of a knowledge service as a "formal" knowledge service is done manually, by a member of the organization. These formal knowledge services may include, for example, a description of the hierarchical structure of the organization, a document concerning the strategy of the organization, a list of members of the organization and lists of answers to the legal department's "frequently asked questions" (FAQ's).

It should be noted that the vertical section shown in FIG. 1E crosses the boundaries of all three horizontal strips, such that the vertical section shown in FIG. 1E includes a portion of all three strips of FIGS. 1B–1D. These formal knowledge services are present in all three categories represented by the horizontal strips, which is the reason for including portions of all three strips in the vertical section. Thus, the categorizations represented by the vertical sections and the horizontal strips are not mutually exclusive, but rather are overlapping.

Similarly, the category of "organic" or less formal knowledge services, contained within the vertical section indicated by the rectangle in FIG. 1F, also includes portions of all three horizontal strips. The designation of a knowledge service as "organic" is again qualitative, and is preferably done manually by a member of the organization. These "organic" knowledge services are more personalized and less official, and may include, for example, icons for various discussion groups, a "bulletin board" for messages and notes, and library resources.

FIG. 1G indicates a vertical section of the map for icons representing those knowledge services which are external to the organization. Preferably, the separation between this vertical section of the map and the other two vertical sections is visually explicit. For example, in the context of a map which is similar to a road map as shown herein, preferably this vertical section is of a different color than the other two vertical sections. More preferably, such a visual separation includes a thick boundary line between this vertical section and the other two sections. Again, in the context of a representation which is similar to a road map, such a thick boundary line could be colored blue to represent a "river" or other natural divider, thereby immediately indicating to the user that this vertical section of the map is different from the others.

External knowledge services are typically knowledge services which are used by the organization, but which do not belong to the organization and which are not managed by the organization. These knowledge services may include, for example, links to external Web sites, but they can also be knowledge services which are exported by the organization to the "outer world" beyond the confines of the organization. Again, these external services are still organized according to the rules for each of the three horizontal strips. Thus, icons for those external knowledge services which are related to the organization as a whole are located in that portion of the upper horizontal strip which is included within this vertical section, while icons representing departmental and personalized external knowledge services are similarly organized in the relevant portions of the vertical section.

FIGS. 2A–2E show various views of the knowledge map of the present invention, in order to demonstrate how the icons are selected and placed on the map, as well as a description of the preferred iconography.

Figure 2A:
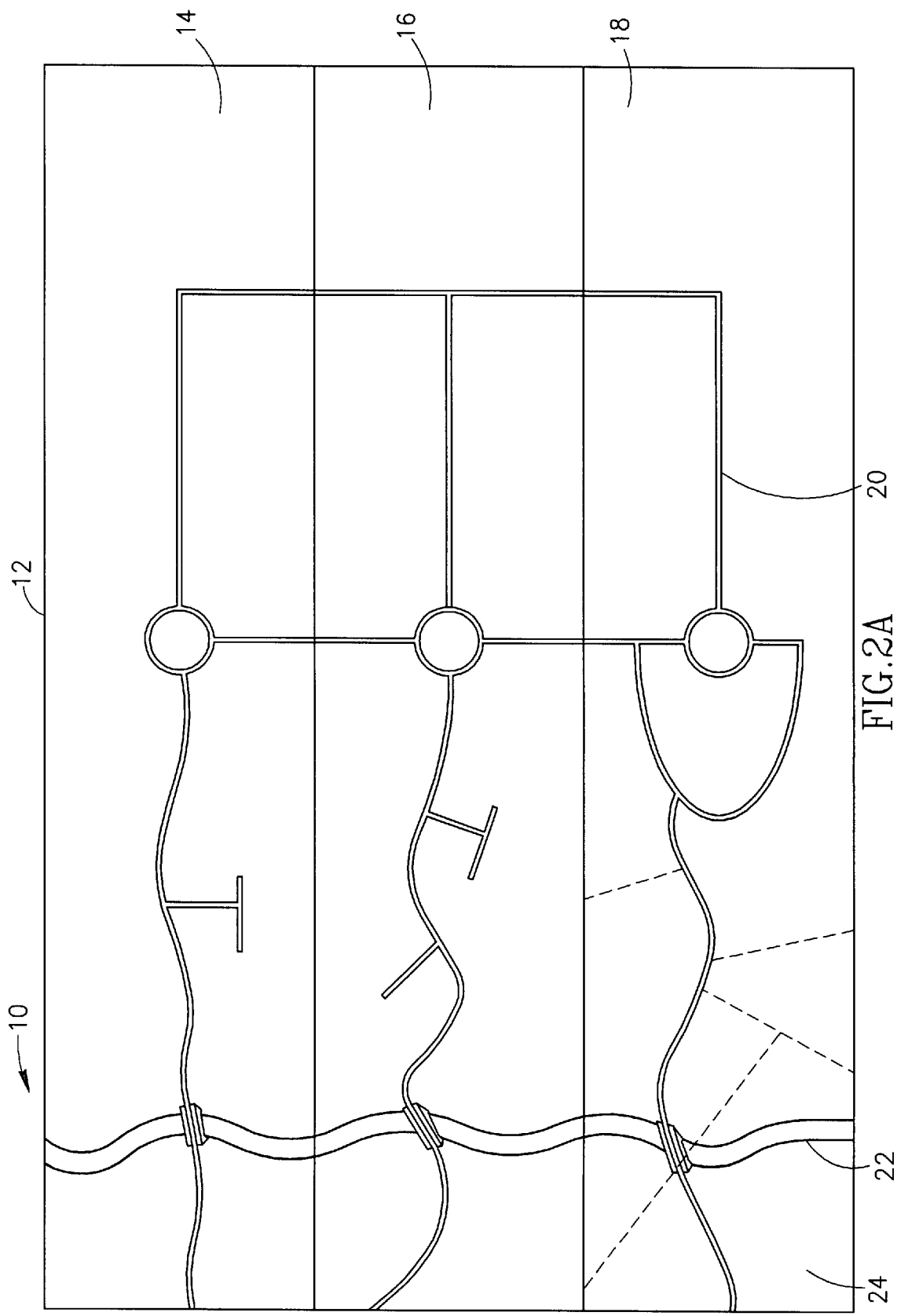

FIG. 2A shows an example of the map illustrated in FIGS. 1A–1G and in FIGS. 2B–2E, but without any icons. As shown, an exemplary map system 10 features a map display 12. Map display 12 has three horizontal strips: a first strip 14 for icons representing knowledge services for the entire organization; a second strip 16 for icons representing departmental knowledge services; and a third strip 18 for icons representing personalized knowledge services, as described previously in FIGS. 1B–1D.

Map display 12 also features a plurality of "roads" 20, which indicate the boundaries between vertical sections as shown. A first section of roads 20, located at the far right of map display 12, is organized with rigid, straight lines, in order to indicate the more formal knowledge services. A second section of roads 20, located in the middle of map display 12, is more curved and less rigidly constructed, to indicate the less formal, "organic" knowledge services. A third section of roads 20, shown as an external section 24 located to the far left of map display 12, is separated from the other two vertical sections by a vertical boundary 22, which is preferably represented as a "river". External section 24 is also preferably a different color than the other two vertical sections, which serves to emphasize the differences between the sections.

Each organization wishing to implement the knowledge management system of the present invention receives a map software interface display without icons, as shown in FIG. 2A, which can also be termed the map display substrate. Preferably, the map display substrate features coordinates, multiple layers, and optionally offers choices for roads, a river and a set of prepared graphic icons. This skeletal map display substrate then evolves into the finished map display software interface according to the requirements of the organization. For example, each organization optionally and preferably determines such characteristics of the map display as the number of horizontal strips, the location of the "river" which marks the boundary between knowledge services of the organization and those which are external to the organization, the type and location of "roads," and the icons selected to represent the various knowledge services.

FIG. 2B shows examples of various types of icons for knowledge services. Each icon is an entry point to the knowledge service represented by that icon, which the user can then access simply by selecting the icon as previously described. For example, a building icon 26 indicates a collection of questions and answers for one topic, or a set of FAQ's. A textual label for building icon 26 indicates that the FAQ covers information related to international trade. A user, viewing building icon 26, would know that the knowledge service which is represented is a set of FAQ's. Thus, building icon 26 provides the user with instant recognition of the contents of the knowledge service.

FIG. 2B also shows how each icon is located within an organizational structure as previously described. The location of building icon 26 within middle strip 16 shows that the FAQ is related to the department of the user. Building icon 26 is also located within the central vertical section of map display 12, which as previously described is related to less formal, more "organic" knowledge services. Thus, again the user is able to instantly recognize where the FAQ represented by building icon 26 fits within the overall organization of the information.

Other icons, shown enlarged in an inset to FIG. 2B, include (from left to right) an amphitheater, which could be a broadcasting message service, for example; a tree, which represents a description of a hierarchical structure, for example; a bench, which represents a discussion group, for example; and a fire truck, which represents an assistance knowledge service, for example. Of course, different icons could be used, and these icons could represent other knowledge services. However, these icons illustrate one preferred but important feature of the iconography of the present invention, which is that the iconography should preferably include stylized representations of common, "everyday" objects. Since these objects already have associations for the user, using these associations helps the user to remember the material represented by the corresponding icon. Thus, iconography which includes stylized representations of common objects is both highly preferred and very important for ease of user understanding and operation of map system 10.

Figure 2C:
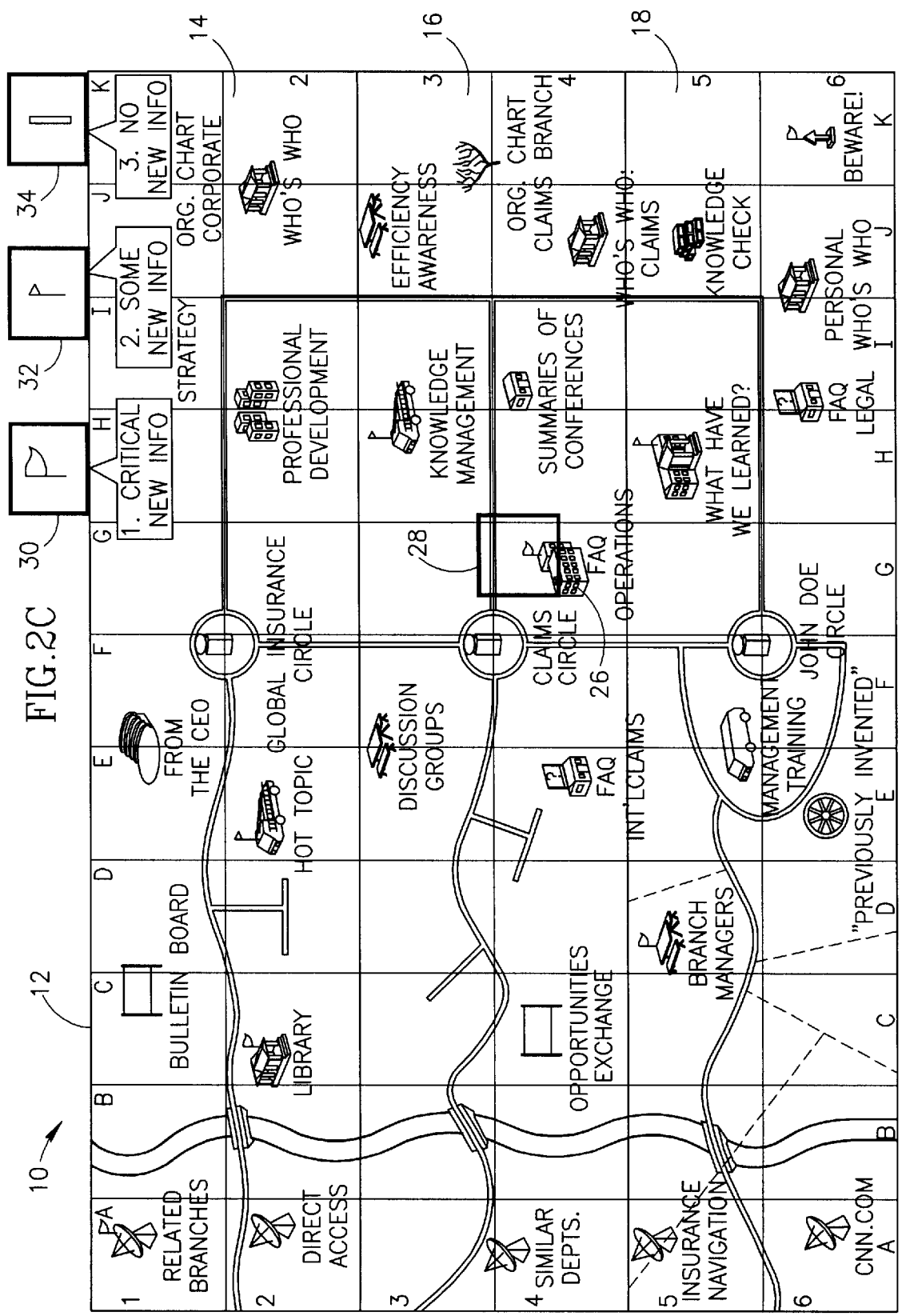

FIG. 2C illustrates another important feature of map system 10, which is the preferred inclusion of flags to indicate the presence of new information in a particular knowledge service. Since map display 12 includes so many different types of knowledge, if the user had to examine each service in order to locate new knowledge, such new knowledge could easily be overlooked. Therefore, preferably a flag 28 is shown as part of icon 26 in order to indicate the presence of new information within the knowledge service represented by icon 26. More preferably, flag 28 is one of three different flags, shown enlarged in FIG. 2C. For example, a critical new information flag 30 preferably indicates that the knowledge service contains critical new information for the specific user of map display 12. A smaller flag 32 preferably indicates that the knowledge service contains new, but not critical, information for the specific user of map display 12. A flagstaff 34 without a flag indicates that there is no new information in the knowledge service. Thus, the user can immediately determine which knowledge services have new information, as well as the degree of urgency of that information, thereby enabling the user to locate such new information quickly and easily.

Figure 2D:
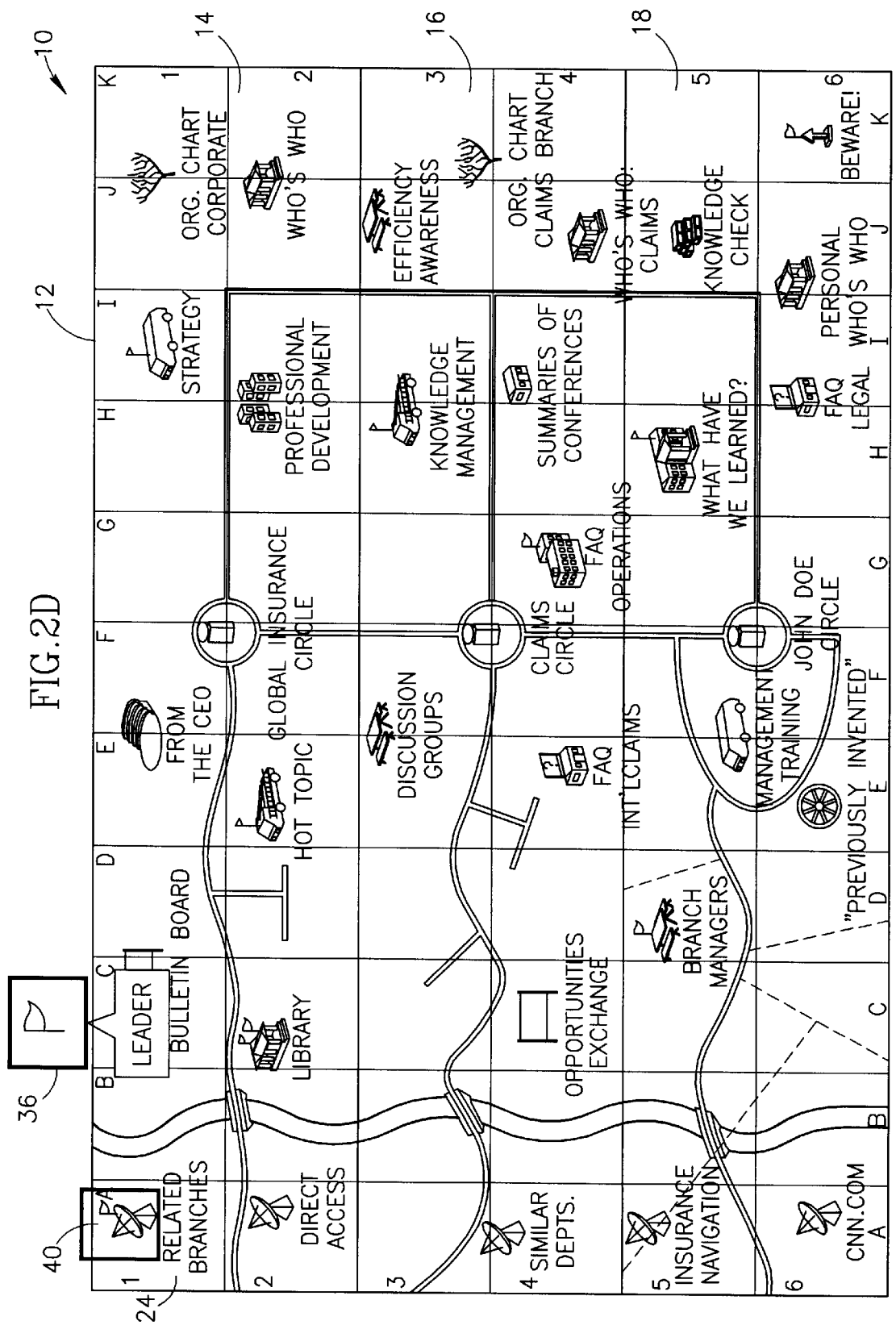

FIG. 2D shows another type of iconic display on map display 12, which is a leader flag display 36. Leader flag display 36 identifies those knowledge services for which the user is a knowledge service leader, by placing a "cap" on the display of the flag to form leader flag display 36, as shown by an icon 40 which has such a leader flag display.

A knowledge service leader is a person who is appointed to maintain a designated knowledge service. This responsibility may include operations such as updating the data contained within the knowledge service, evaluating the effectiveness of the knowledge service, and so forth. Thus, leader flag display 36 reminds the user of those knowledge services which must be maintained by the user, and hence must be examined regularly.

Figure 2E:
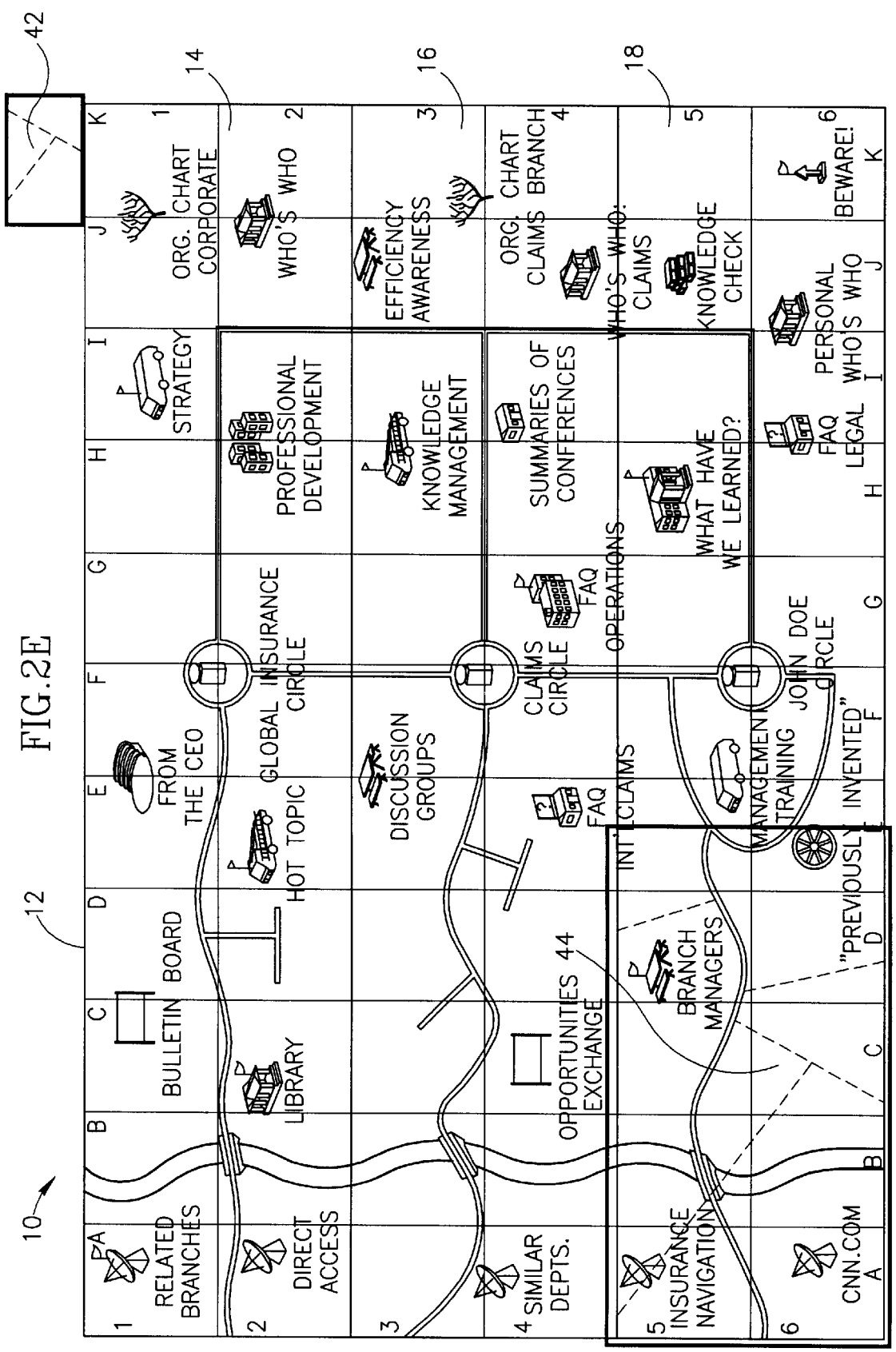

FIG. 2E shows examples of personally established knowledge services, organized and displayed within the context of map display 12. An inset box shows a dotted line icon 42 for the personally established knowledge service, which is also shown within the larger context of map display 12. Dotted line icon 42 delineates the portion of map display 12 for which the individual user is responsible and into which the individual user may place one or more knowledge services as desired.

Figure 3A:
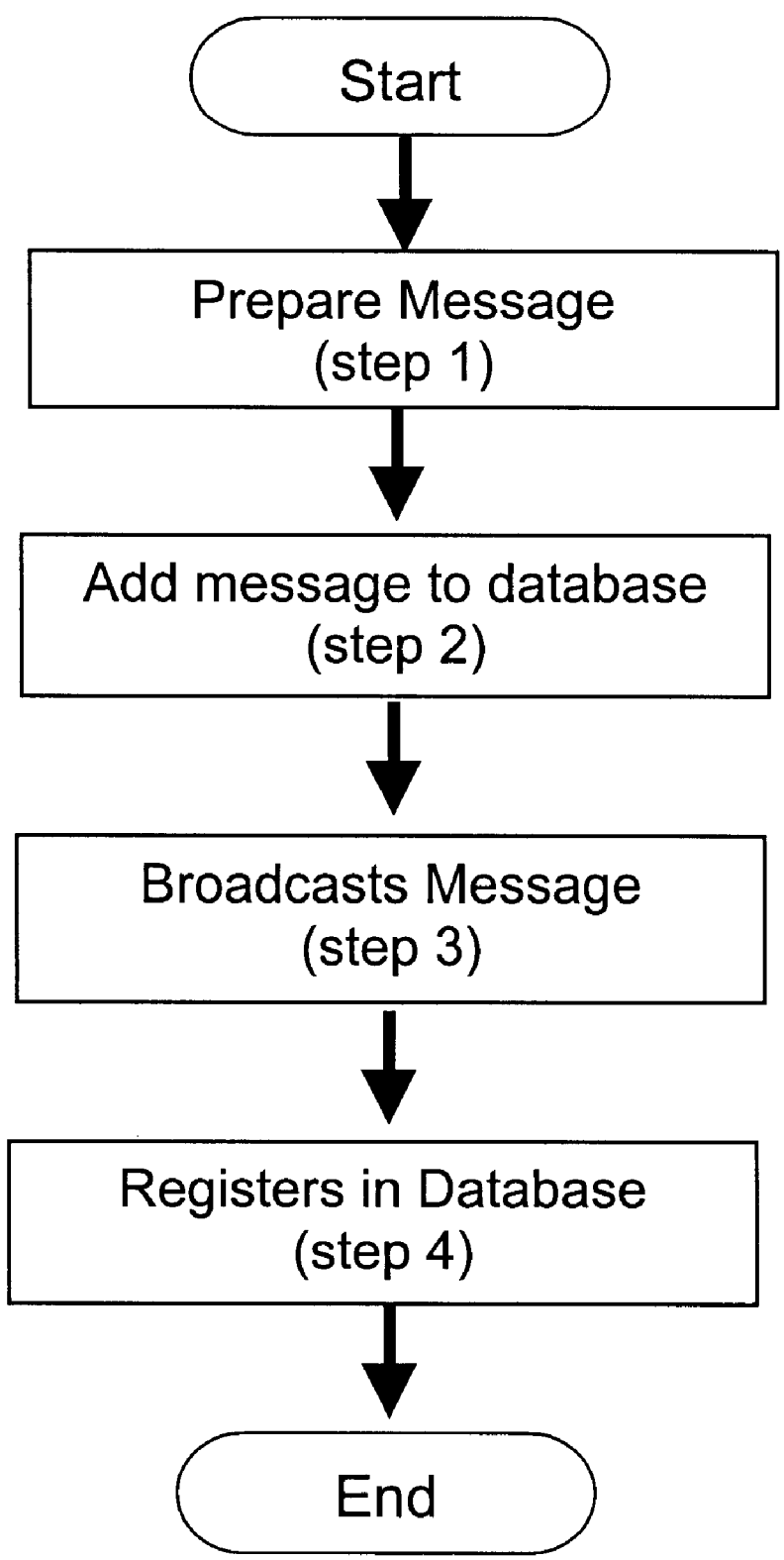
FIGS. 3A and 3B are flowcharts of exemplary methods according to the present invention for distributing new data to users through the knowledge map of the present invention.
Figure 3B:
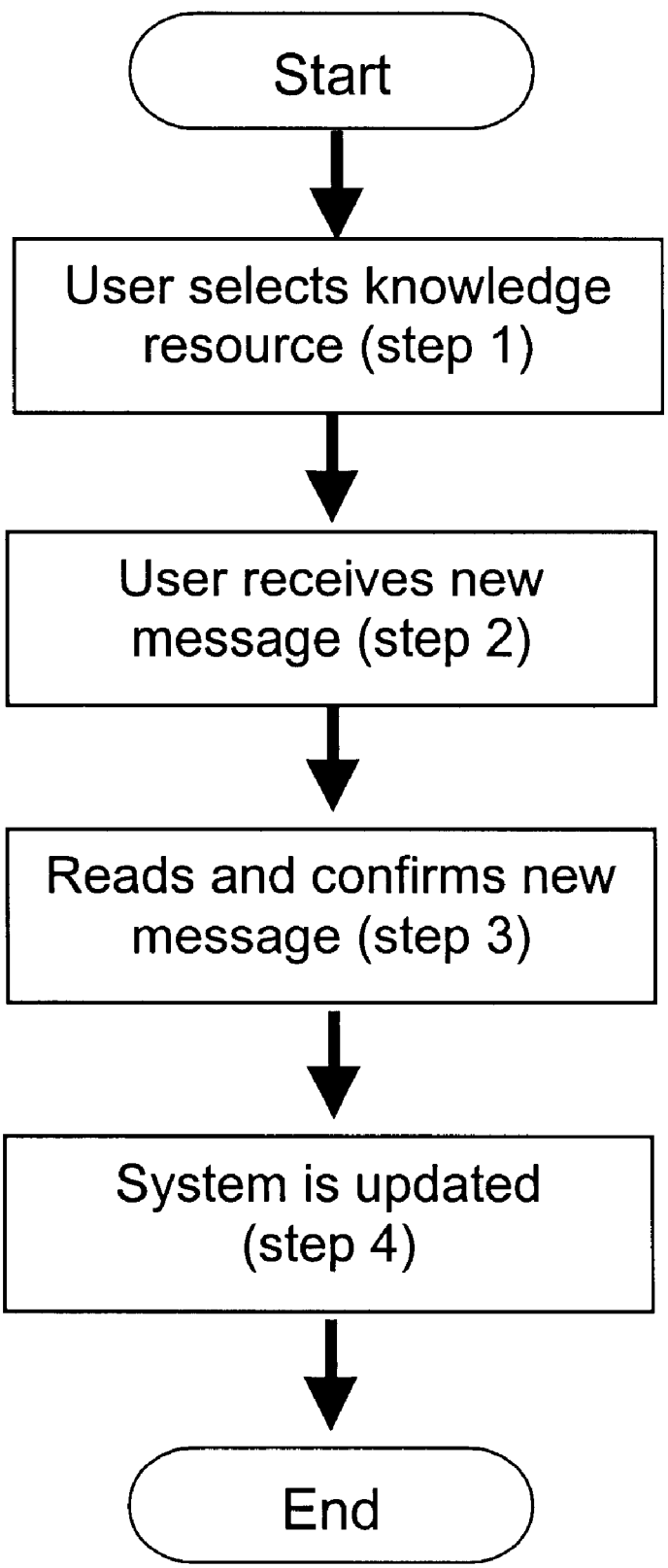

FIGS. 3A and 3B illustrate flowcharts for exemplary methods of distributing and retrieving information through the knowledge management system of the present invention. Collectively, these flowcharts illustrate an example in which a new message from the CEO (Chief Executive Officer) of the organization is distributed to users of the system of the present invention. The users then read this message. The illustrative example shows how the method and system of the present invention enable information to be easily distributed and retrieved.

FIG. 3A shows a flowchart of a method for distributing the new message from the CEO. In step 1, the CEO (or a member of the staff of this officer) prepares the message, for example as a word processing document, and then initiates an internal knowledge management software process described in the steps below.

In step 2, the software process first adds the message to a database associated with the system of the present invention. This database stores the various types of knowledge services, including both the data of the service and one or more associated applications for accessing the data. Preferably, each database is associated with a specific type of information resource, which in this case includes messages from the CEO to the entire organization. In addition, the database preferably stores information which may include, but is not limited to, the type of knowledge service icon associated with the service, the location of the icon on the map display, whether new information is present in the knowledge service, and any other associated information which enables the icon to be properly displayed and accessed by the user.

Preferably, in this step the software also registers that the new message exists, such that new information is available in the knowledge service management system for a particular type of knowledge service.

In step 3, the message is broadcast by the software. Preferably, the steps of broadcasting the message include first reviewing a distribution list for that particular knowledge service. Next, each member on the distribution list is informed that a new message is waiting to be retrieved. More preferably, this step is performed by adding a flag display to the icon representing the knowledge service for messages from the CEO. This flag display is most preferably added to the icon on the maps of all users who are recipients of that knowledge service.

In step 4, the software registers the completion of the process of sending the message in the database. Preferably, the fact that no users have yet retrieved the message is also registered in the database.

FIG. 3B shows a flowchart of the illustrative method, which continues the example of the new message from the CEO with the steps required for the user to read the new message.

In step 1, the user activates the knowledge management system in order to view the personal map display of that user. The display now includes a flag above the icon representing the knowledge service containing messages from the CEO. The user then selects that icon in order to access the knowledge service.

In step 2, the software searches through the associated database (described in FIG. 3A) to locate any item(s) which have not been read by the user. These unread message(s) are then delivered to the user in response to the selection of the icon representing the knowledge service containing messages from the CEO. The user then receives the message or messages.

In step 3, the user reads and confirms each received message. Each such message must be marked by the user to indicate that the message has been read and confirmed. Preferably, the message is marked with the electronic signature of the user, in order to ensure that the user of that particular display map has actually read the message. Thus, the knowledge service management system software is able to record the time that each message is received and read by the user.

In step 4, the software updates both the associated database for this particular knowledge service and the map display of the user, to indicate that the message has been read. The software stores the time at which the message was read and preferably also stores the electronic signature of the user in the database. The map display is updated by altering the flag from the icon representing the knowledge service. Optionally and preferably, the flag is only removed if all messages have been read and confirmed. Otherwise, the flag preferably only changes size to indicate that one or more messages remain to be read and confirmed. Thus, the software of the present invention is able to both store data such as messages and information concerning the data, as well as to display to the user the type of data which is available.

While the invention has been described with respect to a limited number of embodiments, it will be appreciated that many variations, modifications and other applications of the invention may be made.

What is claimed is:

1. A method for displaying a knowledge map software interface for organizing a plurality of knowledge services for a user, for organizing a plurality of organizational knowledge services belonging to an organization, the steps of the method being performed by a data processor, the method comprising the steps of:
   (a) providing a knowledge map display substrate, said knowledge map display substrate being divided into a plurality of portions, each of said portions representing one of a plurality of knowledge categories relating to an organization, wherein the location of each portion indicates a relationship between the knowledge categories;
   (b) providing a plurality of icons for being displayed on knowledge map display substrate, wherein said plurality of icons and said display substrate feature a unified graphic characteristic of common objects as iconography;
   (c) characterizing each of the plurality of knowledge services according to a knowledge category;
   (d) selecting an icon of said plurality of icons for representing each of said plurality of knowledge services;
   (e) placing said icon on one of said plurality of portions of said knowledge map display substrate according to said knowledge category, such that when the user selects said icon, said knowledge service is accessed; and
   (f) adding at least one boundary divider for indicating a division of said knowledge map display substrate into said plurality of portions, wherein said boundary divider is associated with said iconography and wherein the location of each of said at least one boundary divider indicates a border separating knowledge categories.

2. The method of claim 1, wherein said organization features a plurality of internal units, and a first knowledge category corresponds to an entirety of said organization and a second knowledge category corresponds one of said plurality of internal units, a first portion of said knowledge map display substrate corresponding to said first knowledge category and a second portion of said knowledge map display substrate corresponding to said second knowledge category.

3. The method of claim 2 wherein the second portion is located on the map display substrate below the first portion.

4. The method of claim 2, wherein a third knowledge category is a personal category for the user, a third portion of said knowledge map display substrate corresponding to said third knowledge category.

5. The method of claim 4 wherein the third portion is located on the map display substrate below the second portion.

6. The method of claim 4, wherein a fourth knowledge category includes an external knowledge service being external to said organization, a fourth portion of said knowledge map display substrate corresponding to said fourth knowledge category.

7. The method of claim 6 wherein the fourth portion is located on the distal side of the map display substrate and juxtapositioned vertically in relation to the first, second and third portions.

8. The method of claim 7, further comprising at least one vertical boundary divider for separating said fourth portion of said knowledge map display substrate from remaining portions of said knowledge map display substrate.

9. The method of claim 1, wherein said iconography is a geographical iconography and said knowledge map display substrate is a geographical map display substrate.

10. The method of claim 9, wherein said boundary divider for separating said fourth portion of said knowledge map display substrate from remaining portions of said knowledge map display substrate is a curved blue line for symbolizing a river.

11. The method of claim 1, wherein at least one icon represents a personal knowledge service personally selected by the user.

12. The method of claim 1, wherein said knowledge service includes data and at least one software application for accessing said data.

13. The method of claim 12, further comprising the steps of:
   (a) adding new data to a knowledge user;
   (b) distributing said new data to the knowledge map software interface of the user, and
   (c) retrieving said new data by the user.

14. The method of claim 13, wherein the step of distributing said new data includes the step of notifying the user.

15. The method of claim 14, wherein the step of notifying the user includes the step of altering an icon for representing said knowledge service to indicate said new data.

16. The method of claim 15, wherein said icon is altered by adding an altered flag representing said user is a knowledge service leader.

17. The method of claim 15, wherein said icon is altered by adding a flag to said icon.

18. The method of claim 15, further comprising the step of:

(i) confirming reception of said new data by the user.

19. The method of claim 18, wherein said reception is confirmed with an electronic signature of the user.

20. The method of claim 19, further comprising the step of:

(j) managing at least one knowledge service by the user.

* * * * *